Sept. 26, 1944.   E. M. MOREHOUSE   2,359,237
INSTALLATION TOOL FOR CONDUIT CLIPS
Filed March 16, 1943   2 Sheets-Sheet 1
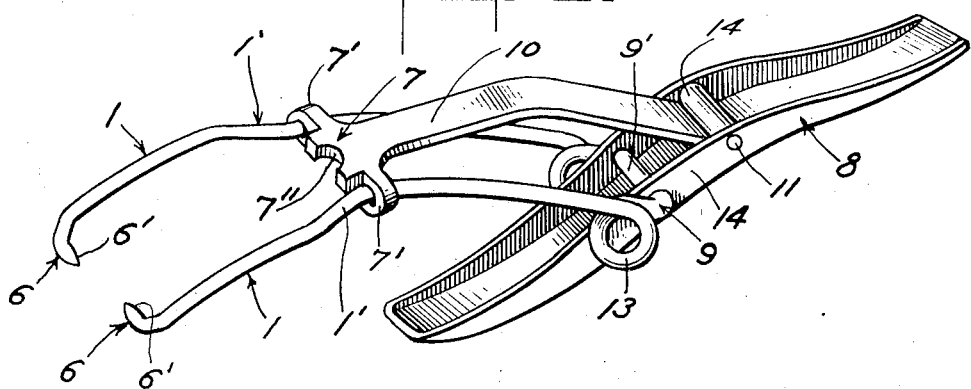
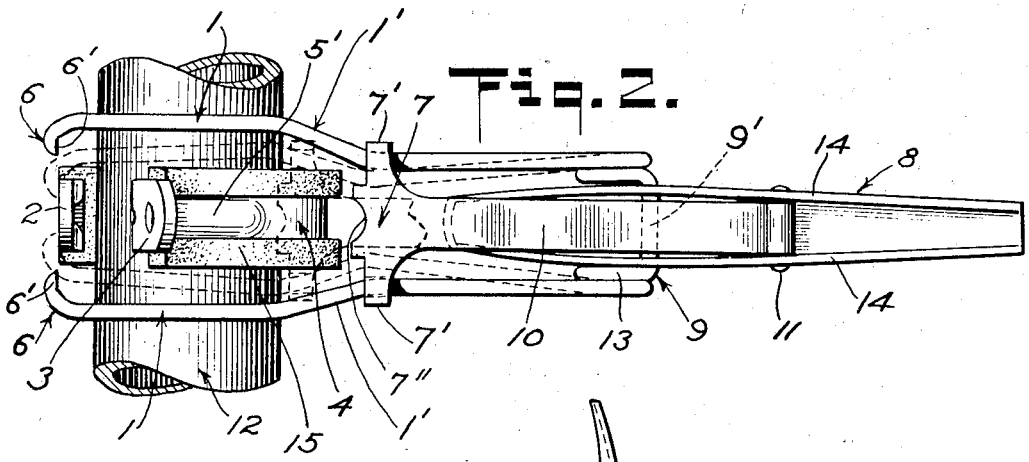
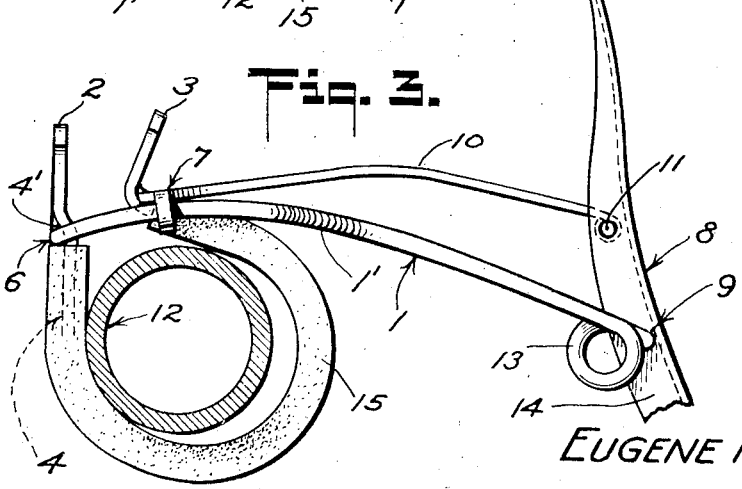
Inventor
EUGENE M. MOREHOUSE
By R. S. Berry
Attorney Sept. 26, 1944.     E. M. MOREHOUSE     2,359,237
INSTALLATION TOOL FOR CONDUIT CLIPS
Filed March 16, 1943     2 Sheets-Sheet 2
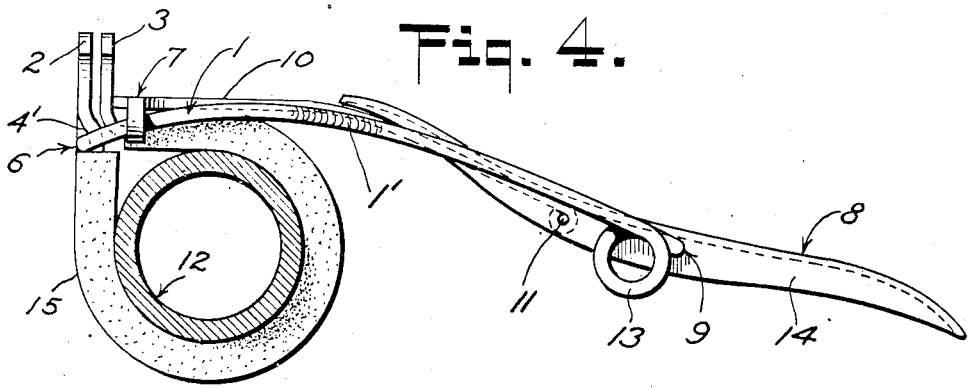
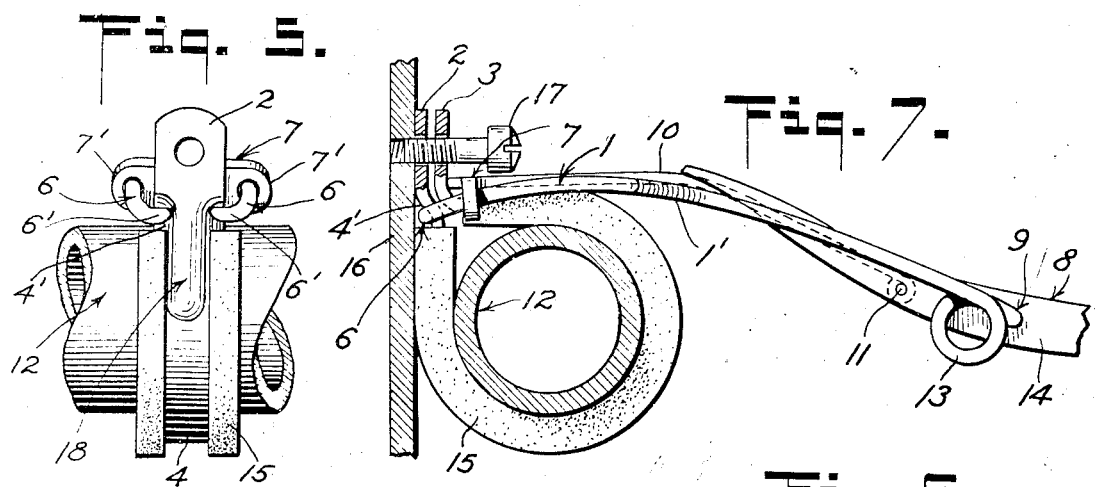
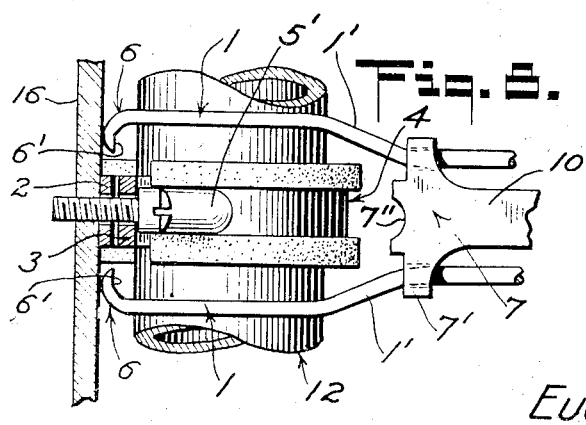
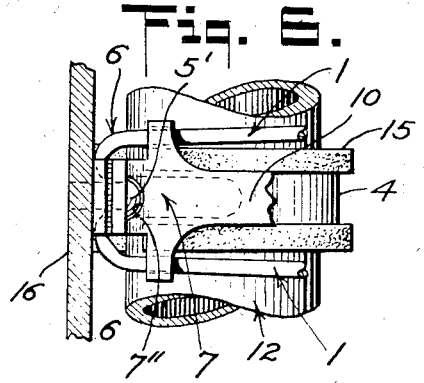
Inventor
EUGENE M. MOREHOUSE
By R. S. Bair
Attorney Patented Sept. 26, 1944

2,359,237

UNITED STATES PATENT OFFICE 2,359,237

INSTALLATION TOOL FOR CONDUIT CLIPS

Eugene M. Morehouse, Tujunga, Calif., assignor to Adel Precision Products Corp., a corporation of California Application March 16, 1943, Serial No. 479,391

9 Claims. (Cl. 81—3)

This invention relates to a tool for assisting in the installation of aircraft conduit clips of the type which includes a tensioned metallic conduit-embracing strap having outwardly extended opposed apertured ends normally spaced apart and adapted to be brought together to clamp the clip on the conduit and fasten the clip to a structural member of the aircraft.

It has been the practice in installing conduit clips of the type above noted for the operator to force the apertured ends of the clip together by hand and so hold them while a screw or bolt is inserted and manipulated to secure the clip on the conduit and to an aircraft structural part. These ends must be held together with one hand while the other hand applies the fastening and in some cases two operators are required for what is normally a "one-operator" job. Considerable strength is required to move the ends of the strap together and so hold them and some operators, especially women, are unable to perform this operation without an assisting operator, or if capable of doing the job are sorely taxed and slowed down so that too much time is required for installing the clips and the efficiency of the worker therefore impaired.

It is the primary object of my invention to provide a novel and efficient plier-like tool by means of which a conduit-supporting clip of the character described may be quickly and easily closed around a conduit and as readily brought into and held in a position on the conduit and relative to the aircraft structure, such that the operation of completing the installation of the clip is simplified, rendered easier and considerably expedited with a consequent saving in effort, labor and installation costs.

Another object of my invention is to provide a tool of the character described which may be readily and easily released from the clip after the screw or bolt fastening is applied to either effect a sub-assembly operation or to complete the installation on an aircraft structural part.

A further object is to provide a tool such as described which is small, compact, simple as to construction, capable of being inexpensively made and exceptionally easy to operate.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a perspective view of a tool embodying my invention;

Fig. 2 is a top plan view of the tool showing in full lines the manner of applying it to a clip and in dotted lines the clip engaging members in their initial clip engaging position;

Fig. 3 is a fragmentary side-elevation showing the tool as when manipulated to the position shown in the dotted lines in Fig. 2, the tool being in the initial clip engaging position ready to force the ends of the strap toward one another;

Fig. 4 is a side elevation of the tool after it has been manipulated to close the clip on the conduit and hold it in such position;

Fig. 5 is a rear elevation showing the clip and tool as when manipulated to the position shown in Fig. 4;

Fig. 6 is a fragmentary plan view of the clip and tool as shown in Fig. 5;

Fig. 7 is a fragmentary side elevation showing how the tool is manipulated to position and hold the clip against a structural part of the aircraft while the fastening for the clip is being applied to complete the installation thereof;

Fig. 8 is a fragmentary top plan view showing the manner of removal of the tool after the fastening has been manipulated to hold the clip on the conduit and the aircraft.

As shown in the accompanying drawings, one embodiment of my improved tool generally comprises opposed arms 1 spaced apart so that they may be positioned on opposite sides of the apertured ends 2 and 3 of a metal conduit-embracing strap 4 of a conduit clip; jaw means 6 carried by said arms for engaging the outer face of the end 2 of the strap, a slidable jaw 7 on said arms for engaging the outer face of the end 3 of the strap, a lever 8, a pivotal connection 9 between the arms 1 and the lever 8 providing a fulcrum for the lever, and an arm 10 extending from the slidable jaw and pivoted as at 11 to said lever. The arm 10 serves as a link so that upon appropriate movement of the lever 8 the jaw 7 is moved into engagement with the end 3 to force the ends 2 and 3 toward one another thereby closing the strap 4 and clamping the clip on the conduit 12 as shown in Fig. 4.

In accordance with my invention the arms 1 are preferably formed of spring wire and have their outer or free ends bent inwardly toward one another forming opposed hook or jaw member 6' which constitute the jaw means 6 and are normally spaced apart a distance greater than the width of the ends 2 and 3. The arms 1 are joined by an integral cross member 9' constituting the pivotal connection or fulcrum 9.

The slidable jaw 7 has apertured ears 7' slidably receiving the arms 1 so that as the jaw 7 is moved toward the jaw members 6' the ears 7' will encounter the convergent obliquely extended intermediate portions 1' of said arms and force the arms toward one another to position the jaw members on the end 2 as shown in dotted lines in Fig. 2 and also in full lines in Fig. 5. On retracting the jaw 7 the arms 1 will spring apart and assume their normal position as shown in Fig. 1, in which position the jaws 6' may be readily positioned as shown in full lines in Fig. 2 or as readily removed from the clip.

It should be noted that the jaw 7 has a notch 7" therein to accommodate the rib 5' at the juncture of the end 3 with the strap 4 proper, whereby the jaw may be closely and securely engaged with said end.

For the purpose of accommodating the tool to clips having apertured ends of different thicknesses, the arms 1 are provided with loops 13 intermediate their ends.

The lever 8 is provided with longitudinal marginal flanges 14 and the pivot portion 9' of the arms 1 at the point approximately centrally of the ends of the lever is extended through these flanges as best shown in Figs. 1 and 2.

The arm 10 as here shown is formed integral with the jaw 7 but may be otherwise connected thereto as desired and the pivotal connection 11 of said arm with the lever is preferably made between the flanges 4 at a point between the pivot 9' and the outer end of the lever.

The clip 4 has a conduit-embracing cushion 15 of yieldable material such as rubber, synthetic rubber or like compressible and preferably elastic material, mounted in the metal strap 4 so as to leave the ends 2 and 3 bared.

The metal strap of the clip is resilient and the ends 2 and 3 are normally well spaced apart to facilitate the mounting of the clip on the conduit. These ends must be brought together so that a fastening may be applied to hold the clip on the conduit, and also provide for the fastening of the clip to a structural part of an aircraft, such as the part 16 here shown. In the present case a screw 17 is employed for this purpose as shown in Figs. 7 and 8.

The end 2 of the strap 4 is outwardly offset from the plane of the portion 4' of the said end which portion forms the juncture of the end proper with the strap as shown in Figs. 4, 5 and 7, thereby defining a space as shown in Fig. 7 between the structural member 16 and the strap for accommodating the jaws 6' while the end 2 proper is engaged with the structural member 16, and making possible a ready removal of said jaw or the insertion thereof during or after the installation of the clip. Fig. 8 shows how the jaws 6' can be inserted or removed while the clip is secured or is being secured to the structural member 16.

The strap 4 as here shown has a reinforcing rib 18 extending along the medial line of the juncture portion 4' and as seen in Fig. 5 the jaws 6' engage the end 2 on opposite sides of this rib and are thereby maintained in reliable gripping engagement with the end 2.

As shown in full lines in Fig. 2 the tool is applied so that the arms 1 extend on opposite sides of the ends 2 and 3 of the strap with the jaws 6' in position to be forced inwardly to overlie the outer face of said end. The lever is now swung upwardly and forwardly on the pivotal connection 9 so that the arm 10 will push the jaw 7 against the clip as shown in dotted lines in Fig. 2. At this point it should be noted that the inclined portions 1' on the arms are encountered by the sliding jaw 7 and the arms moved inwardly toward one another to position the jaws 6' against the end 2 before the sliding jaw engages the end 3 of the strap. Further movement of the lever 8 toward the jaw 7 causes the latter to engage the end 3 as shown in Fig. 3 so that on continuation of such movement of the lever the jaw 7 will force the end 3 into close relation to the end 2 as shown in Fig. 4, thereby aligning the apertures in said ends for reception of the screw 17. The lever 8 as shown in Fig. 4 now lies substantially in the plane of the arms 1 and 10 and the tool may easily be held with one hand to position the clip with the conduit therein against the structural member 16 as shown in Fig. 7; the screw being then readily inserted and manipulated with the other hand to secure the clip to the member 16 and clamp it on the conduit. Fig. 8 shows the clip completely installed and how on retraction of the jaw 7 the arms 1 will spring apart and remove the jaws 6' from the end 2 so that the tool may be withdrawn from the clip.

It should be noted that the arms 1 are curved so that the jaws 6' will readily fit into the "pockets" formed at 4' at the juncture of the end 2 with the strap proper below the plane of the jaw 7; when the tool is applied to the clip as shown in Fig. 3. This arrangement makes possible a ready application and manipulation of the tool to force the ends 2 and 3 together with the apertures therein aligned and ready for reception of the fastening member 17.

It is important to note that due to a toggle locking action taking place when the lever 8 and arms 1 are brought into the position shown in Figs. 4 and 7, it is not necessary for the operator to hold the lever and arms together to maintain the ends of the clip together or the tool on the clip, thereby leaving free both hands of the operator. When this locking action occurs the pivot 11 moves past center and below the plane of the arms 1 as shown in Figs. 4 and 7, thereby holding the tool on the clip as shown in Fig. 4.

From the foregoing description it will be seen that the invention relates to a tool which consists solely of a single piece of wire, a rivet and two pieces of sheet metal, the latter being reinforced by flanges and one of them having aperture portions which slidably engage said wire; thus providing for rapid, low cost manufacture.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a tool for installing a conduit clip having opposed ends normally spaced apart and adapted to be forced toward one another to clamp the clip around the conduit and position said ends for reception of a fastening member; opposed arms spaced apart so that they may be positioned on opposite sides of the ends of the conduit clip, jaw means on said arms disposed to be engaged with the outer face of one of said ends, a slidable jaw extending between and supported on said arms so as to be movable thereon into and out of an endwise engagement with the outer face of the other end of the clip, a lever, pivotal connection between said lever and said arms providing a fulcrum for the lever, and an arm extending outwardly from said slidable jaw and pivoted to said lever so that on rocking the lever on its fulcrum the slidable jaw may be moved into and out of engagement with said other end.

2. In a tool for installing a conduit clip having opposed ends normally spaced apart and adapted to be forced toward one another to clamp the clip around the conduit and position said ends for reception of a fastening member; opposed wire arms spaced apart so that they may be positioned on opposite sides of the ends of the conduit clip, jaw means on said arms disposed to be engaged with the outer face of one of said ends, a slidable jaw consisting of a plate associated with said arms so as to be movable to abut one of its ends against and bring it out of engagement with the outer face of the other end of the clip, said plate having apertured portions adjacent to its clip engaging end slidably engaging said wire arms, a lever, a connection between said lever and said arms providing a fulcrum for the lever, and an arm extending outwardly from said slidable jaw and pivoted to said lever at a point between said fulcrum and one end of the lever.

3. In a tool for installing a conduit clip having opposed ends normally spaced apart and adapted to be forced toward one another to clamp the clip around the conduit and position said ends for reception of a fastening member; opposed arms spaced apart so that they may be positioned on opposite sides of the ends of the conduit clip, jaw means on said arms disposed to be engaged with the outer face of one of said ends, a slidable jaw associated with said arms so as to be movable into and out of engagement with the outer face of the other end of the clip, a lever, a connection between said lever and said arms providing a fulcrum for the lever, and an arm extending outwardly from said slidable jaw and pivoted to said lever so that on rocking the lever on its fulcrum the slidable jaw may be moved into and out of engagement with said other end, said jaw means comprising opposed inwardly turned end portions of said arms, and means for moving said arms toward one another to position said portions against said one end of the clip while the slidable jaw is being moved into position to engage the other end portion of said clip.

4. In a tool for installing a conduit clip having opposed ends normally spaced apart and adapted to be forced toward one another to clamp the clip around the conduit and position said ends for reception of a fastening member; opposed spring arms spaced apart so that they may be positioned on opposite sides of the ends of the conduit clip, jaw means on said arms disposed to be engaged with the outer face of one of said ends, a slidable jaw associated with said arms so as to be movable into and out of engagement with the outer face of the other end of the clip, a lever, a connection between said lever and said arms providing a fulcrum for the lever, an arm extending outwardly from said slidable jaw and pivoted to said lever so that on rocking the lever on its fulcrum the slidable jaw may be moved into and out of engagement with said other end, said jaw means comprising jaw members formed by inwardly turned opposed end portions of said spring arms which jaw members are normally spaced apart a greater distance than the width of said ends, and means for moving said spring arms toward one another to position the jaw members on said one end of the clip when the sliding jaw is moved into engagement with the other end of the clip.

5. In a tool for installing a conduit clip having opposed ends normally spaced apart and adapted to be forced toward one another to clamp the clip around the conduit and position said ends for reception of a fastening member; opposed arms spaced apart so that they may be positioned on opposite sides of the ends of the conduit clip, jaw means on said arms disposed to be engaged with the outer face of one of said ends, a slidable jaw consisting of a plate extending between and having apertured portions slidable along said arms so as to be movable into and out of engagement with the outer face of the other end of the clip, and means associated with said arms and said slidable jaw for moving the slidable jaw toward and away from the jaw means on said arms.

6. In a tool for installing a conduit clip having ends normally spaced apart and adapted to be forced together to clamp the clip around a conduit and dispose said ends in position to receive a fastening element for holding them together, opposed arms spaced apart so that they may be positioned on opposite sides of the ends of the conduit clip, inwardly turned ends on said arms normally spaced apart a distance greater than the width of the ends of the clip and subject to being moved toward one another to lie over the outer face of one of said ends of the clip, a slidable jaw on said arms movable to engage the other of said ends of the clip to force said ends together, means for moving said slidable jaw toward and away from said inwardly turned ends, and means operating during movement of said slidable jaw for forcing the inwardly turned ends of said arms toward one another so as to overlie the outer face of said one end of the clip whereby continued movement of said slidable jaw will force the ends of the clip together.

7. In a tool for installing a conduit clip having ends normally spaced apart and adapted to be forced together to clamp the clip around a conduit and dispose said ends in position to receive a fastening element for holding them together, opposed spring arms spaced apart so that they may be positioned on opposite sides of the ends of the conduit clip, inwardly turned ends on said arms normally spaced apart a distance greater than the width of the ends of the clip and subject to being moved toward one another to lie over the outer face of one end of the clip, a slidable jaw on said arms movable to engage the other of said ends of the clip to force said ends together, means for moving said slidable jaw toward and away from said inwardly turned ends, and means operating during movement of said slidable jaw for forcing the inwardly turned ends of said arms toward one another so as to overlie the outer face of said one end of the clip whereby continued movement of said slidable jaw will force the ends of the clip together.

8. In a tool for installing a conduit clip in which one of the two opposed and normally spaced apart apertured ends is outwardly offset from the clip, and the two ends are adapted to be brought together to clamp the clip on a conduit and dispose said ends in alignment for reception of a fastening element, a pair of spring arms normally spaced apart so that they may be moved past the side edges of the two ends of the clip, inwardly turned ends on said arms normally spaced apart a distance greater than the width of the ends of the clip and subject to being moved toward one another to lie inwardly spaced from the offset end of the clip upon the outer face of the portion of the clip at the juncture of said offset end of the clip proper, a jaw slidable on said arms, means for moving said jaw toward and away from said inwardly turned ends, and means operating when the slidable jaw is moved toward the inwardly turned ends for moving the arms toward one another and disposing the inwardly turned ends in overlying relation to the outer face of said juncture portion of said offset end of the clip and for spreading said arms and moving said inturned ends clear of said clip when the sliding jaw is retracted.

9. In a tool for installing a conduit clip in which one of the two opposed and normally spaced apart apertured ends is outwardly offset from the clip, and the two ends are adapted to be brought together to clamp the clip on a conduit and dispose said ends in alignment for reception of a fastening element, a pair of spring arms normally spaced apart so that they may be moved past the side edges of the two ends of the clip, inwardly turned ends on said arms normally spaced apart a distance greater than the width of the ends of the clip and subject to being moved toward one another to lie inwardly spaced from the offset end of the clip upon the outer face of the portion of the clip at the juncture of said offset end of the clip proper, a jaw slidable on said arms, a lever fulcrumed on said arms, an arm extending from said slidable jaw and pivoted on said lever for moving said slidable jaw toward and away from said inturned ends upon movement of said lever on its fulcrum, and converging portions on said arms which are traversed by said slidable jaw so as to move said arms toward and away from one another to move said iturned ends into and out of engagement with the juncture portion of said offset end.

EUGENE M. MOREHOUSE.